United States Patent
Jang

Patent Number: 5,809,122
Date of Patent: Sep. 15, 1998

[54] APPARATUS FOR DISPLAYING CALL CHARGES IN TELEPHONE AND METHOD THEREOF

[75] Inventor: Young Bae Jang, Kyungki-do, Rep. of Korea

[73] Assignee: LG Semicon Co., Ltd., Chungcheongbuk-Do, Rep. of Korea

[21] Appl. No.: 676,686

[22] Filed: Jul. 10, 1996

[30] Foreign Application Priority Data

Jul. 11, 1995 [KR] Rep. of Korea .................. 1995 20365

[51] Int. Cl.⁶ .................................................. H04M 15/00
[52] U.S. Cl. ........................................... 379/140; 379/130
[58] Field of Search .................................... 379/112, 113, 379/114, 115, 117, 118, 119, 120, 130, 131, 132, 133, 140, 141, 143, 144, 155, 157; 235/375, 377, 378

[56] References Cited

U.S. PATENT DOCUMENTS

| | | | |
|---|---|---|---|
| 4,461,928 | 7/1984 | Hashimoto | 379/131 |
| 4,813,065 | 3/1989 | Segala | 379/112 |
| 5,046,085 | 9/1991 | Godsey et al. | 379/112 |
| 5,400,395 | 3/1995 | Berenato | 379/114 |
| 5,425,085 | 6/1995 | Weinberger et al. | 379/131 |
| 5,519,769 | 5/1996 | Weinberger et al. | 379/130 |

*Primary Examiner*—Paul Loomis
*Attorney, Agent, or Firm*—Morgan, Lewis & Bockius LLP

[57] ABSTRACT

A call charge display apparatus in a telephone includes an input for inputting a telephone number, a transceiver for transmitting and receiving a call, a controller for receiving telephone usage information from the transceiver portion and the input, for calculating call charges, and for controlling the display of the calculated call charges, and a display for displaying call particulars from the controller.

20 Claims, 2 Drawing Sheets

F I G.1
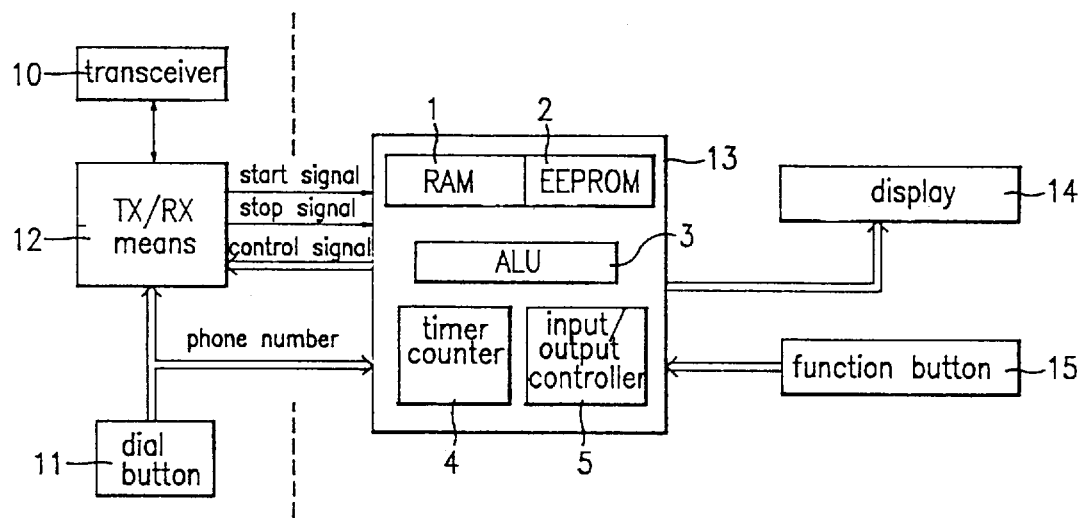

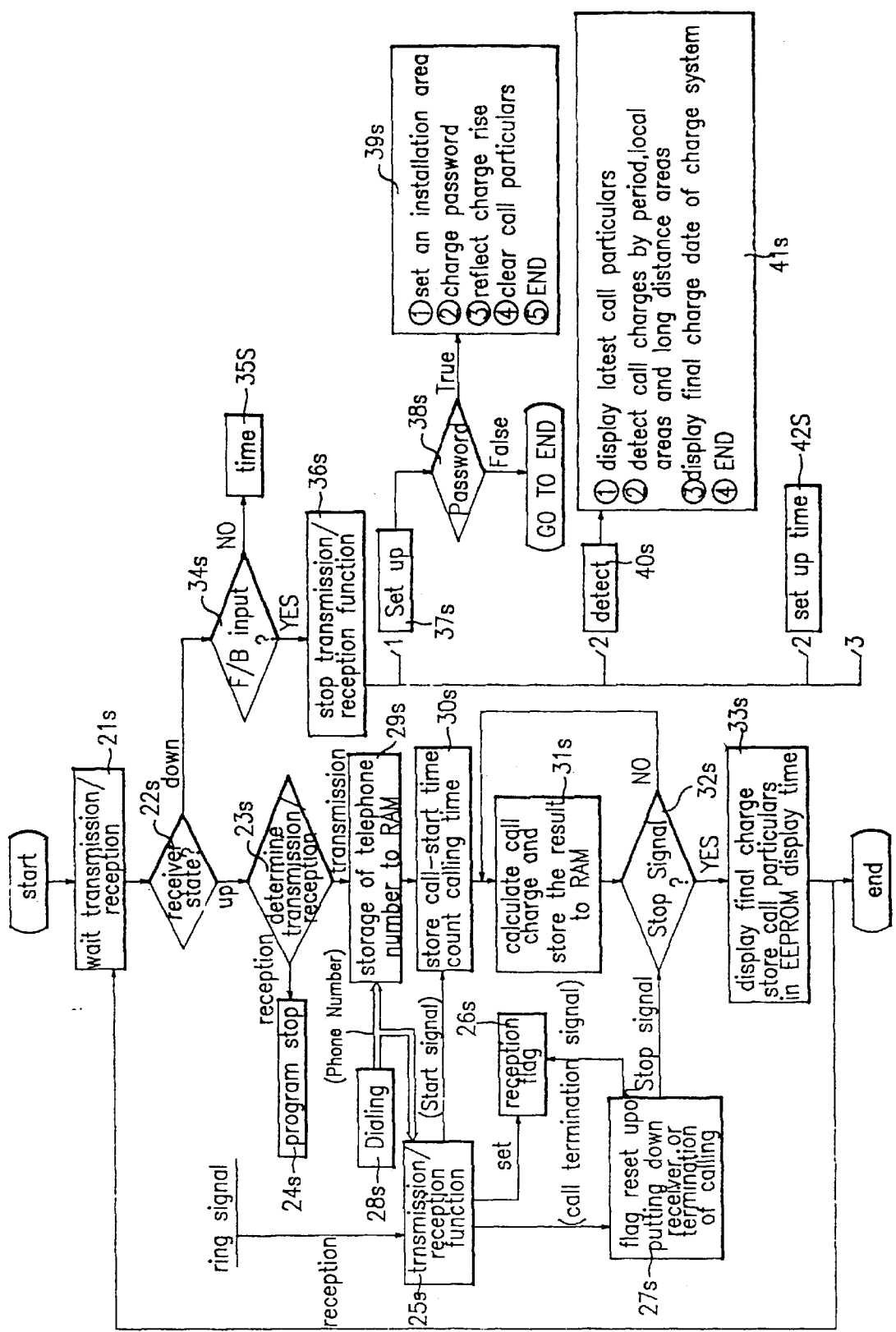

APPARATUS FOR DISPLAYING CALL CHARGES IN TELEPHONE AND METHOD THEREOF

BACKGROUND OF THE INVENTION

1. Field of the Invention

The present invention relates to a telephone apparatus for displaying call charges, and more particularly, to an apparatus for displaying telephone call charges in order to identify long distance call charges in commercial sites or households not equipped with public telephones.

2. Discussion of the Related Art

In essence, the basic function of a telephone in transmitting a call is to convert a voice into an electrical signal or to convert an electrical signal sent from a counterpart's telephone as a voice in receiving a call. To accommodate the recent variety of functions added to telephones, such as simplified manipulations for a user's convenience or services for the counterpart during a telephone conversation, microcomputers are incorporated into the telephone to realize various functions.

Currently, the user's convenience is greatly enhanced because of the development of various telephone peripheral equipment using microcomputers. However, a telephone which immediately displays call charges has not yet been developed. Although a public telephone can display the balance amount obtained by subtracting call charges from the deposited money depending on the transmission area and duration, it cannot store call particulars for later use. Also, public telephone payment is prepaid by telephone card or by coins. In addition, such telephones are not installed in homes.

Further, in the conventional telephone, call charges cannot be estimated until a telephone charge notice is issued. Specifically, when several people share a telephone, it is not possible for a user to be informed of his/her call charges during or immediately after a call. Thus, the expenses cannot be fairly distributed to the users. Moreover, call particulars cannot be searched or confirmed to calculate accurate charges.

OBJECTS AND SUMMARY OF THE INVENTION

Accordingly, an object of the present invention is a telephone apparatus for displaying telephone call charges which substantially obviates the problems due to limitations and disadvantages of the related art.

Another object of the present invention is to provide a telephone apparatus that can easily identify call charges on a shared telephone.

Additional features and advantages of the invention will be set forth in the description which follows, and in part will be apparent from the description, or may be learned by practice of the invention. The objectives and other advantages of the present invention will be realized and attained by the structure particularly pointed out in the written description and claims hereof as well as the appended drawings.

To achieve these and other advantages and in accordance with the purpose of the present invention, as embodied and broadly described, the apparatus for displaying call charges in a telephone includes a dial button portion through which a telephone number of an intended counterpart is input in making a call; a transceiver portion for performing a call transmission and reception; a controlling portion for receiving telephone use information from the transceiver portion and the dial button portion and for calculating call charges to control the calculated call charges to be displayed; a displaying portion for outputting call particulars supplied from the controlling portion and for outputting messages to exchange information with users; and a function button portion for inputting a message for additional functions.

In another aspect, a method for displaying call charges includes the steps of (a) detecting a transceiver state while waiting for a call transmission/reception, setting a reception flag to prohibit the operation of the charge calculating program if there is an incoming call, and resetting a reception flag if the call is received when the call conversation is terminated; (b) temporarily storing the counterpart's telephone number if the detected transceiver state is a transmission state in step (a), counting the call conversation time, calculating call charges using a charge-table-by-area and a charge calculating routine, displaying the calculated charges until the transmission is terminated, stopping the charge calculation when the call conversation is terminated, displaying a final charge, and storing the temporarily stored call particulars; (c) displaying the call charges for a predetermined time after terminating the call conversation to then enter a call transmission/reception wait state; (d) stopping the transmission/reception function if the transceiver is left down and there is an input of a function button, and displaying the selected function.

In a further aspect, the apparatus for displaying call charges in a telephone includes an input for inputting a telephone number; a transceiver for transmitting and receiving a call; a controller for receiving telephone usage information from the transceiver portion and the input, for calculating call charges, and for controlling the display of the calculated call charges; and a display for displaying call particulars from the controller.

In another aspect, the method for displaying call charges includes the steps of detecting a transceiver state while waiting for a call transmission/reception; if the transceiver state is a reception state, setting a reception flag to prohibit a charge calculating program, and resetting a reception flag if the call is received when a previous call is terminated; and if the transceiver state is a transmission state, temporarily storing call particulars, timing the call, calculating call charges, displaying the calculated charges, stopping the charge calculation when the call is terminated, displaying a final charge, and storing the temporarily stored call particulars.

To further accomplish the above objects, there is provided an apparatus for displaying call charges in a telephone comprising a dial button portion through which a caller's desired telephone number of the counterpart intended to make a call is input, a transceiver portion for performing a call transmission and reception; a controlling portion for receiving telephone use information from the transceiver portion and the dial button portion and calculating call charges to control the calculated call charges to be displayed; a displaying portion for outputting call particulars supplied from the controlling portion and a message necessary for information exchange between users; and a function button portion through which a message for additional functions is input.

Also, there is provided a method of displaying call charges in a telephone comprising the steps of detecting a transceiver state in a call transmission/reception wait state, setting a reception flag and stopping a charge calculating program if there is a telephone call, and resetting the reception flag in terminating the telephone conversation if the telephone call is answered (step 1); temporarily storing the counterpart's telephone number and counting the duration of the telephone conversation in case of transmission in the step 1, calculating the call charges using a charge table by areas and a charge calculation routine and continuously displaying the calculated call charges until storage and transmission are completed, stopping the calculation of charges at the time of terminating the telephone conversation to display the final charge and to store the temporarily stored call particulars (step 2); displaying the call charges for a predetermined time after terminating the telephone conversation and then turning into a call transmission/reception wait state (step 3); and stopping a call transmission/reception function to display a selected function if the transceiver is left down in the step 1 and there is an input of a function button (step 4).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a block diagram of a call charge display apparatus in a telephone according to the present invention; and FIG. 2 is a flowchart showing the operation of displaying call charges in a telephone according to the present invention.

DETAILED DESCRIPTION OF THE INVENTION

Reference will now be made in detail to the preferred embodiments of the present invention, examples of which are illustrated in the accompanying drawings.

As shown in FIG. 1, the call charge display apparatus in a telephone according to the present invention includes a dial button portion 11 through which a caller's desired telephone number of the counterpart intended to make a call is input, a transmission/reception means 12 for performing a call transmission and reception via transceiver 10, a controlling means 13 for receiving telephone use information (a telephone number input value, a call conversation start signal or call conversation stop signal) from transmission/reception means 12 and dial button portion 11 and for calculating call charges to control the calculated call charges to be displayed, a displaying portion 14 for performing functions such as a clock and for outputting call charges calculated in controlling means 13, call particulars and a message necessary for information exchange between users, and a function button portion 15 through which call transmission/reception functions are stopped and messages for additional functions are input to controlling means 13.

Here, controlling means 13 includes a random access memory (RAM) 1 for temporarily storing the table of charges per second by area and the telephone number of the counterpart input from dial button portion 11, an EEPROM 2 for storing an operating table of controlling means 13, a charge table by area and user's call particulars, a timer counter 4 for starting to count when the counterpart's telephone number is input from dial button portion 11 to start a call with the counterpart in transmission/reception means 12 and for counting the call conversation time until the call is terminated, an arithmetic logic unit (ALU) 3 for reading in the counterpart's telephone number stored in RAM 1, the charge-table-by-area stored in EEPROM 2 and the call conversation time of timer counter 4 and for performing logic operations with respect to call charges, and input/output controller 5 for outputting the respective control signals depending on the data input to ALU 3 and controlling means 13.

The operation of the call charge display apparatus in a telephone according to the present invention will now be described with reference to FIG. 2.

A call transmission or reception is waited (step 21) and a transceiver state is checked (step 22). If transceiver 10 is up, it is determined whether the state is transmission or reception (step 23). If it is the reception state (an incoming call), a reception flag is set (step 26) and the operation of the charge calculating program (step 24) is stopped when the call is received by transmission/reception means 12. When the call is terminated, the reception flag is reset (step 27).

If a transmission state is detected in step 23, a dialing signal (step 28) of dial button portion 11, corresponding to the telephone number, is temporarily stored in RAM 1 (step 29).

If a call start signal indicating the start of a call is generated, the current time is stored in RAM 1 and the call time is counted in timer counter 4 (step 30).

Successively, call area charges calculated in ALU 3 using the area code of the telephone number stored in RAM 1, the charge-table-by-area stored in EPROM 2 and the charge calculating routine, and the calculation result value is stored in RAM 1 and is output to display 14. These operations are repeated until the transmission is terminated (step 31).

If a call stop signal generated when transceiver 10 is put down or the call is terminated (step 32), the calculation of the call charges is stopped, and the fin al charge is displayed. Also, the call starting time (temporarily stored in RAM 1), the call charges, and the telephone number in EEPRM 2 are stored.

A delay time for checking the call charges after terminating the call is set to be displayed in display 14 for a constant time (step 33) to enter a call transmission or reception wait state.

It is determined whether transceiver 10 is down in step 22 and there is an input of a function button (F/B) (step 34). If there is no F/B input, the current time is output to display 14 (step 35). If there is an input of F/B, the transmission/reception function is stopped (step 36) so that a proper menu message may be output.

The important data of the menu is set up (step 37) to pass through a password (step 38). If the call charges increase, an encrypted code disabling user's discretionary change is supplied by a telephone manufacturer to reflect the call charge rise.

Also, in order to reflect the call charges depending on the relative distance, a menu for setting an installation place is provided (step 39). A detection step (step 40) detects the latest call particulars stored in EEPROM 2, the call charges by period, local areas and long distance areas, and the final change date of the charge system to then be displayed in step 41.

In a clock set-up menu (step 42), an exact time is set.

Functional complement is allowed and maintenance is facilitated such that a clock is internally installed for reflecting late hour extra charges and only an EEPROM is separately replaced for up-grade for reflecting a call charge increase. Also, the dial buttons are used as function buttons to allow versatile input and output. Further, instead of the EEPROM used in the present invention, the cheapest electrically erasable and programmable read only nonvolatile memory (EEPROM) or a flash memory may be adopted.

As described above, the present invention has advantages in that an unnecessarily long time call conversation, especially during a long distance call, is prohibited and the call particulars are detected to control the call charges precisely, in a general household telephone which can display the call charges.

Also, when the telephone according to the present invention is installed in a commercial site, the basis of the charges collection depending on the customer's call is supplied, which eliminates the need of using a telephone installed for long distance dialing. When a telephone is used by multiple users, a fair basis of call charge payment can be supplied. Also, even before arrival of a call charge notice, a user can be informed of his own telephone usage particulars, thereby implementing a convenient user condition.

It will be apparent to those skilled in the art that various modifications and variations can be made in the apparatus for displaying call charges in a telephone of the present invention without departing from the spirit or scope of the invention. Thus, it is intended that the present invention cover the modifications and variations of this invention provided they come within the scope of the appended claims and their equivalents.

What is claimed is:

1. A call charge display apparatus in a telephone to be used by a plurality of users, comprising:

a dial button portion through which a telephone number of an intended counterpart is input in making a call;

a function button portion for inputting function selections;

a transceiver portion for performing a call transmission and reception;

a controlling portion for receiving telephone use information from the transceiver portion and the dial button portion and for calculating call charges according to selectively changeable operation data of a nonvolatile memory to control the calculated call charges to be displayed, wherein the selectively changeable operation data includes data regarding each one of the plurality of users input using the dial and function button portions; and a displaying portion for outputting call particulars supplied from the controlling portion and for outputting messages to exchange information with users.

2. The call charge display apparatus in a telephone according to claim 1, wherein the controlling portion includes a random access memory (RAM) for temporarily storing a table of charges per second by area and the telephone number of the counterpart input from the dial button portion, the nonvolatile memory for storing an operation table of the controlling portion, a charge table by area and user's call particulars, a timer counter for starting to count when the call conversation with the counterpart is started until the call conversation is terminated, an arithmetic logic unit (ALU) for performing logic operations with respect to call charges depending on the areas and time, and input/output controller for controlling input and output data.

3. The call charge display apparatus in a telephone according to claim 1, wherein the nonvolatile memory for storing the operation program of the controlling portion is an electrically erasable and programmable read only memory (EEPROM).

4. A call charge display method in a telephone to be used by a plurality of users, comprising the steps of:

(a) detecting a transceiver state while waiting for a call transmission/reception, setting a reception flag to prohibit the operation of the charge calculating program if there is an incoming call, and resetting a reception flag if the call is received when the call conversation is terminated;

(b) temporarily storing the counterpart's telephone number if the detected transceiver state is a transmission state in step (a), counting the call conversation time, calculating call charges using a charge-table-by-area and a charge calculating routine stored in an EEPROM, displaying the calculated charges until the transmission is terminated, stopping the charge calculation when the call conversation is terminated, displaying a final charge, and storing the temporarily stored call particulars in the EEPROM;

(c) displaying the call charges for a predetermined time after terminating the call conversation to then enter a call transmission/reception wait state;

(d) stopping the transmission/reception function if the transceiver is left down and there is an input of a function button, and displaying the selected function, wherein the charge-table-by-area is selectively changeable according to input from the plurality of users and includes data regarding each one of the plurality of users.

5. The call charge display method in a telephone according to claim 4, wherein the current time is displayed if there is no input of a function button in step (d).

6. The call charge display method in a telephone according to claim 4, wherein the latest call particulars, the call charges by period, local areas and long distance areas, and the final change date of the charge system are displayed in step (d) according to the selected function button.

7. A call charge display apparatus in a telephone to be used by a plurality of users, comprising:

an input for inputting a telephone number, function selections and information regarding each one of the plurality of users;

a transceiver for transmitting and receiving a call;

a controller for receiving telephone usage information from the transceiver portion and the input, for calculating call charges, and for controlling the display of the calculated call charges, wherein the controller includes a nonvolatile memory for storing operation data, the operation data being selectively changeable according to the information received from the input; and a display for displaying call particulars from the controller.

8. The call charge display apparatus according to claim 7, further comprising a function selector for selecting additional functions.

9. The call charge display apparatus according to claim 8, wherein the function selector includes a function button portion.

10. The call charge display apparatus according to claim 7, wherein the controller includes:

a random access memory for temporarily storing a table of charges and the telephone number from the input;

an EEPROM for changeably storing the operation data, the operation data including an operation table of the controller, a charge table by area, and the call particulars;

a timer for timing a duration of the call;

an arithmetic logic unit (ALU) for performing logic operations with respect to call charges; and input/output controller for controlling input and output of data.

11. The call charge display apparatus according to claim 10, wherein the nonvolatile memory for storing the operation program of the controller includes an electrically erasable and programmable read only memory.

12. The call charge display apparatus according to claim 7, wherein the call charges depend on an area called and the duration of the call.

13. The call charge display apparatus according to claim 7, wherein the input includes a dial button portion.

14. A call charge display method in a telephone to be used by a plurality of users, comprising the steps of:

detecting a transceiver state while waiting for a call transmission/reception;

if the transceiver state is a reception state, setting a reception flag to prohibit a charge calculating program, and resetting a reception flag if the call is received when a previous call is terminated; and if the transceiver state is a transmission state, temporarily storing call particulars, timing the call, calculating call charges using operation data stored in a selectively changeable nonvolatile memory, displaying the calculated charges, stopping the charge calculation when the call is terminated, displaying a final charge, and storing the temporarily stored call particulars in the selectively changeable nonvolatile memory, wherein the selectively changeable operation data includes data manually input regarding each one of the plurality of users.

15. The call charge display method according to claim 14, further comprising the steps of:

displaying the call charges for a predetermined time after the call is terminated and entering a call transmission/reception wait state; and if the transceiver is down and a function input is provided, stopping the transmission/reception wait state and displaying a selected function.

16. The call charge display method according to claim 14, wherein the step of calculating call charges includes the step of calculating call charges using a charge-table-by-area and a charge calculating routine stored in the selectively changeable nonvolatile memory.

17. The call charge display method according to claim 15, further comprising the step of displaying the current time if the transceiver is down and no function input is provided.

18. The call charge display method according to claim 15, wherein the step of displaying the selected function includes the steps of displaying latest call particulars, detecting call charges by period, local areas and long distance areas, and displaying the final charge date of the charge system.

19. The call charge display apparatus according to claim 10, wherein the input includes a dial button portion and a function button portion, the operation data of the EEPROM being selectively changeable according to input received from at least one of the dial button portion and the function button portion.

20. The call charge display method according to claim 16, wherein the selectively changeable nonvolatile memory includes an EEPROM.

* * * * *